C. F. BUDROE.
FORK FOR BICYCLES AND THE LIKE.
APPLICATION FILED AUG. 8, 1914.
1,144,753.
Patented June 29, 1915.
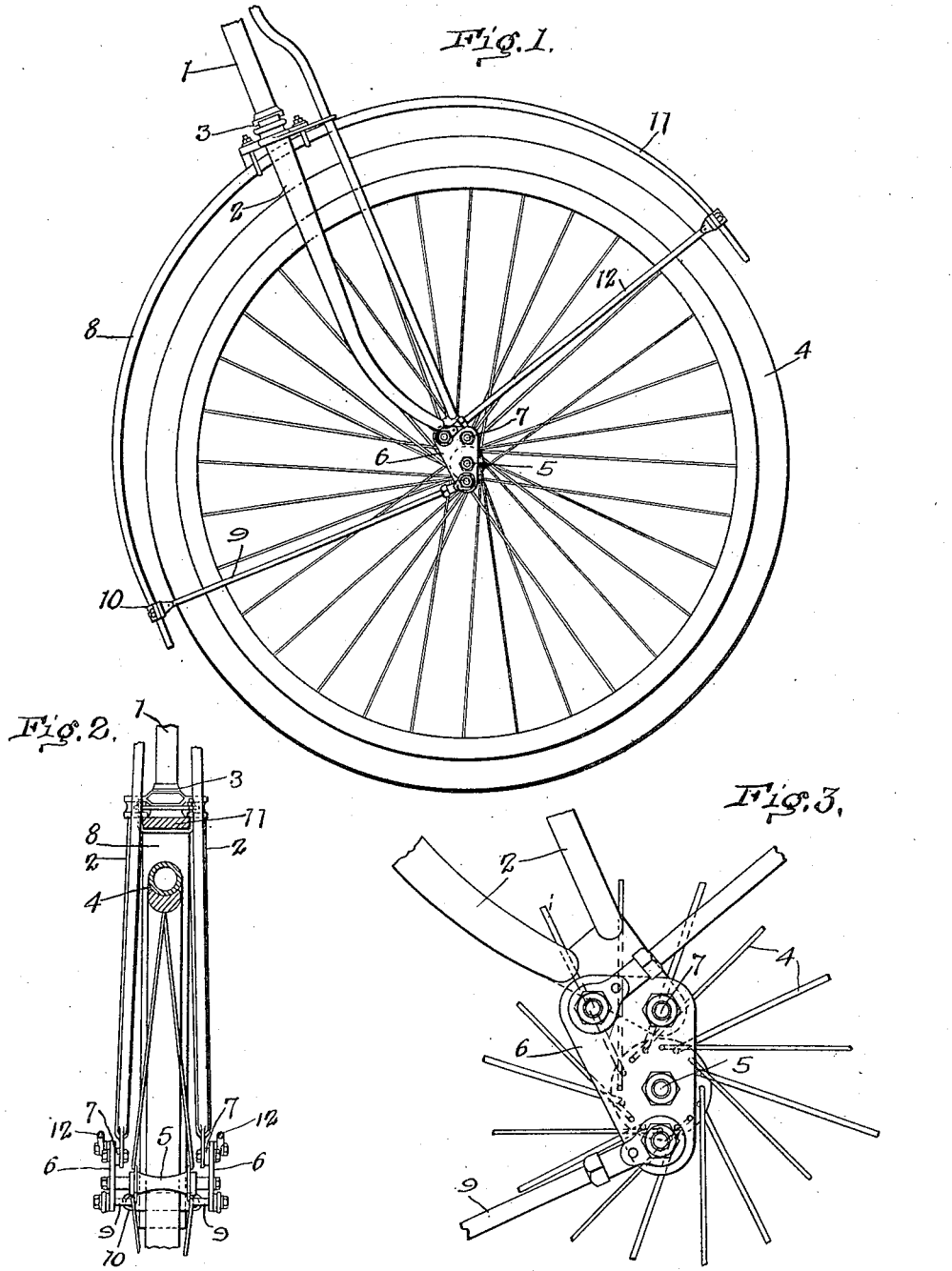
Witnesses
Inventor
Charles F. Budroe.
By
Attorneys.

UNITED STATES PATENT OFFICE.

CHARLES F. BUDROE, OF DAYTON, OHIO, ASSIGNOR TO THE DAVIS SEWING MACHINE COMPANY, OF DAYTON, OHIO, A CORPORATION OF OHIO.

FORK FOR BICYCLES AND THE LIKE.

1,144,753.

Specification of Letters Patent. Patented June 29, 1915.

Application filed August 8, 1914. Serial No. 855,737.

*To all whom it may concern:*

Be it known that I, CHARLES F. BUDROE, a citizen of the United States, residing at Dayton, in the county of Montgomery and State of Ohio, have invented certain new and useful Improvements in Forks for Bicycles and the like, of which the following is a specification, reference being had therein to the accompanying drawing.

This invention relates to bicycles, motor-cycles and the like, and more particularly to a resilient or cushioned connection between the steering wheel and the steering head.

Various attempts have been made to provide such a connection but for the most part these attempts have resulted unsatisfactorily, one of the principal reasons being that the attempt to cushion the connection resulted in a weak construction. One of the most satisfactory constructions heretofore produced consists in pivoting the steering fork to the steering head or crown on a transverse, horizontal axis, so that the steering wheel will be capable of forward and rearward movements, and connecting the axle of the wheel to a leaf spring which is secured to the steering head and curved about the wheel. The spring resists the movement of the fork in either direction about its axis and tends to absorb the shock occasioned by the wheel coming in contact with irregularities in the road over which it is being ridden. However, the construction calls for a pivot at the point of connection between the fork and the steering head, a point which is subjected to very severe strains and which should have great strength.

The object of the present invention is to provide a resilient connection, between the steering wheel and the steering head, of such a character that the structure will have the same strength as the ordinary non-resilient construction; and further, to so arrange the connection that the wheel will be moved against the action of the cushioning device by a shock or blow received at any possible point on the periphery thereof, thus insuring an efficient cushioning action.

In the accompanying drawings, Figure 1 is a side elevation of the front portion of a bicycle showing the steering wheel and steering fork; Fig. 2 is a vertical, sectional view taken centrally of the wheel in Fig. 1; and Fig. 3 is a detail view of the connecting lever.

In carrying out my invention I prefer to utilize the ordinary rigid fork which has at its upper end a steering head journaled on a substantially vertical axis in the frame of the bicycle and which is bifurcated to extend downward on both sides of the steering wheel. The lower end of this fork I connect with the axle of the steering wheel in such a manner that the wheel will have bodily movement relatively to the fork, in the plane of the wheel, and I provide a spring which is preferably carried by the fork and is so connected with the wheel as to resist its movement relatively to the fork.

In the accompanying drawings I have illustrated one embodiment of my invention and have shown the same as applied to an ordinary bicycle, a portion of the frame of which is indicated at 1. Carried by this frame is a steering fork 2 which is here shown as of ordinary construction and has at its upper end a steering head 3 journaled in the frame 1 for steering movement. Mounted between the arms of the fork 2 is an ordinary bicycle wheel 4 having the usual axle 5. This wheel is connected with the lower ends of the arms of the fork by means of suitable connecting devices, there being preferably one device for each arm of the fork. In the present instance each connecting device comprises a plate 6 so arranged as to constitute a bell crank lever. This plate is mounted upon the axle 5 and preferably has rotary movement thereon. The plate or lever extends some distance above the axle and is pivotally connected near its upper end with the lower end of the adjacent arm of the fork, as shown at 7. The axis of this pivotal connection is preferably out of alinement with the axle 5 and the upper end or steering head 3 of the fork. Consequently, any upward thrust or shock on the wheel will cause the wheel to move about the axis of its connection with the fork. To resist this movement I connect a spring with the lever and so arrange the same that it will yield to permit the movement of the wheel but will absorb the shock due to the impact of the wheel with the obstruction or irregularity in the road. This spring is preferably carried by the fork, and, in the present instance, it comprises a leaf spring 8 secured to the fork near the upper end thereof and curved downward about the periphery of the wheel. A suitable connection, such as a rod 9, extends between the lower portion of the spring and the plate or lever 6. In the present instance this rod is connected with the lever at a point below the axle 5 of the wheel, the lever having a downwardly extending portion to permit of this connection. Consequently, any movement of the wheel about the axis 7 will cause an outward thrust on the spring 8. In order that the tension of the spring may be regulated the rod 9 is connected with the leaf spring by means of a clamp 10 which can be adjusted along the spring. It will be understood that the connecting device 9 comprises two rods, one arranged on either side of the wheel and the inner ends of the two rods are connected with the depending portions of the respective plates 6. Preferably, a second spring is connected with each lever 6 on the other side of the axis of the lever 6, as in this manner the movement of the lever can be better controlled, but it will be understood that I do not consider the second spring as essential to the operation of the device. As here shown, this second spring comprises a second leaf spring 11 also secured to the upper end of the fork 2, extending forwardly about the periphery of the wheel and connected by connecting rods 12 with portions of the levers 6 extending above the axle 5 and also, in the present instance, above the axis 7 upon which the lever is mounted. Thus, the movement of the lever about the axis 7 will impose an outward thrust upon the spring 11 as well as upon the spring 8. The springs 8 and 11 are shown in the present embodiment of the invention as formed integral, but when clamped to the fork they constitute separate springs and they have, therefore, been treated as separate springs.

The operation of the device will be readily understood from the foregoing description and it will be apparent that I have provided a resilient connection between the wheel and the supporting frame, in the present instance, the steering fork, which will cushion a shock received at any possible point on the periphery of the wheel; and that the device is of such a construction that the fork and the coöperating frame retain all the strength of the ordinary rigid fork.

While I have shown and described one embodiment of my invention and have shown the same as applied to a bicycle, it will be undestood that the invention is applicable not only to bicycles but to other devices of a similar character, and further, that while the device is primarily designed for use on the steering wheel of a bicycle, and would probably have its greatest utility in this connection, the invention is not limited to steering wheels and the term "fork" as herein used is intended not only to cover the ordinary bicycle fork, as shown in the drawings, but also to cover wheel-supporting devices of any character to which the invention might be applied. It will also be understood that while I have illustrated the invention as utilizing two leaf springs, arranged about the periphery of the wheel in the front and rear of the fork, this construction is not essential and the springs may be arranged in any suitable manner, and further, the term "spring" is intended to include any cushioning device capable of use in this combination and of performing the functions of the spring of the application. Therefore, it will be understood that I do not wish to be limited to the details of construction shown and described, for various modifications will occur to one skilled in the art.

Having thus fully described my invention, what I claim as new and desire to secure by Letters Patent, is:—

1. In a bicycle or the like, a fork, a connecting device pivotally connected to said fork, a wheel having its axle secured to said connecting device at a point below the point of connection of said device to said fork, and a spring secured to said fork and connected with said device at a point below the axle of said wheel.

2. In a bicycle or the like, a wheel having an axle, a connecting device secured between its ends to said axle, a fork pivotally connected to said device at a point above said axle and in front of a line extending lengthwise of said fork and through said axle, a spring secured to said fork and arranged in the rear thereof, and a connection between said spring and that portion of said connecting device which lies below said axle.

3. In a bicycle or the like, a wheel having an axle, a connecting device secured between its ends to said axle, a fork pivotally connected to said device at a point above said axle and in front of a line extending lengthwise of said fork and through said axle, and two springs secured to said fork extending to the front and to the rear thereof and respectively connected with said device above and below said axle.

4. In a bicycle or the like, a wheel having an axle, a connecting device secured to said axle and extending above and below the same, a rearwardly inclined fork pivotally connected at its lower end to said device at a point above said axle, a spring secured to said fork, extending to the rear thereof and connected with said device at a point below said axle, and a second spring secured to said fork, extending in the front thereof and connected to said device above said axle and in the rear of the connection between said device and said fork.

5. In a bicycle or the like, a wheel having an axle, a connecting device secured to said axle and extending above and below the same, a rearwardly inclined fork pivotally connected at its lower end to said device at a point above said axle, a spring secured to said fork, extending to the rear thereof and connected with said device at a point below said axle, the points of connection of said device with said fork, said axle and said spring being arranged in a substantially vertical line.

6. In a bicycle or the like, a wheel having an axle, a lever mounted on said axle and pivotally connected with said fork at a point remote from said axle to permit said wheel to have bodily movement relatively to said fork, a spring carried by said fork, curved about said wheel and connected with said lever above the pivotal connection of said lever with said fork, and a second spring carried by said fork and connected with said lever below the pivotal connection of said lever with said fork.

7. In a bicycle or the like, a fork, a wheel having an axle, a lever mounted on said axle and pivotally connected with said fork at a point remote from said axle to permit said wheel to have bodily movement relatively to said fork, and springs carried by said fork, curved about said wheel to the front and the rear of said fork and, respectively, connected with said lever above and below the axis of the connection of said lever with said fork.

8. In a bicycle or the like, a fork, a wheel having an axle, a lever mounted on said axle and pivotally connected with said fork at a point remote from said axle to permit said wheel to have bodily movement relatively to said fork, and springs carried by said fork, curved about said wheel in the front and the rear of said fork, and rods connecting the respective springs with said lever, the connections being so arranged that one rod lies above the point of connection of said lever with said fork and the other rod lies below the point of connection.

9. In a bicycle or the like, a fork, a wheel having an axle, a bell crank lever pivotally mounted on said fork, one arm of said lever being connected with the axle of said wheel at a point below the point of connection with said fork, and a spring connected with the other arm of said bell crank lever to resist its movement about its axis.

10. In a bicycle or the like, a fork, a wheel having an axle, a bell crank lever mounted on said fork, the axle of said wheel being connected with one arm of said lever, and springs connected with said fork and with the respective arms of said bell crank lever.

11. In a bicycle or the like, a fork, a wheel having an axle, a bell crank lever pivotally mounted on said fork, the axle of said wheel being connected with one arm of said lever, leaf springs secured to said fork and extending about the periphery of said wheel in the front and the rear of said fork, and connecting devices extending between said springs and the respective arms of said bell crank lever.

In testimony whereof, I affix my signature in presence of two witnesses.

CHARLES F. BUDROE.

Witnesses:
  JOHN B. PARMLEE,
  JOHN M. HUFFMAN.